UNITED STATES PATENT OFFICE.

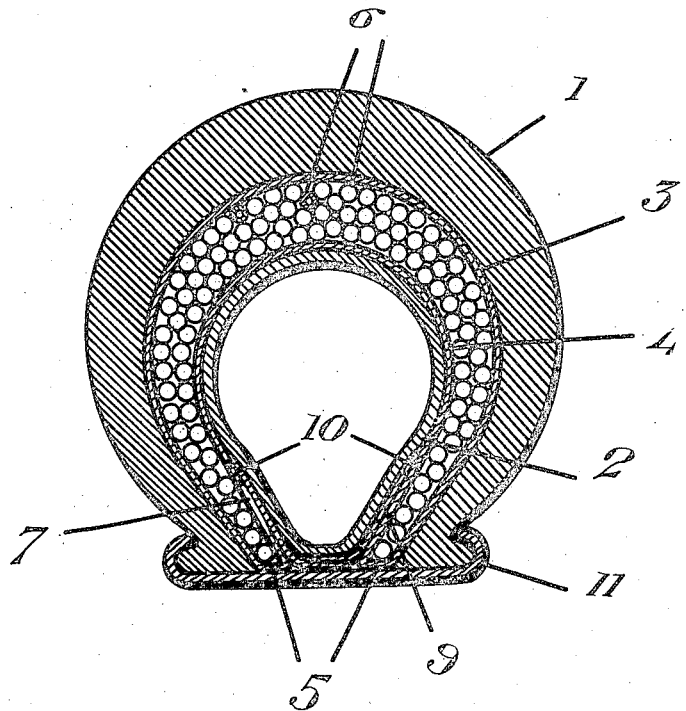

EDWARD M. BECKMAN, OF GARY, INDIANA.

PNEUMATIC TIRE.

1,415,140.  Specification of Letters Patent.  Patented May 9, 1922.

Application filed May 17, 1920. Serial No. 381,915.

*To all whom it may concern:*

Be it known that I, EDWARD M. BECKMAN, a citizen of the United States, residing at Gary, in the county of Lake and State of Indiana, have invented certain new and useful Improvements in Pneumatic Tires, of which the following is a specification, reference being had therein to the accompanying drawing.

The present invention relates to pneumatic tires, and has for its object the provision of a novel and improved device or insert to be used between the tire casing and inner tube to serve as an armour or protector for the inner tube to prevent puncturing thereof, and to also afford a cushion between the inner tube and casing for increasing the resiliency of the tire.

A further object is the provision of a bag or pocket of a cross section to fit between the tire casing and inner tube and filled with resilient members, which protect the inner tube from being punctured as well as adding to the resiliency and cushioning action of the tire.

A still further object is the provision of such a device having provision for the insertion and removal of the resilient filler members, and means for protecting the inner tube.

With the foregoing and other objects in view, which will be apparent as the description proceeds, the invention resides in the construction and arrangement of parts hereinafter described and claimed, it being understood that changes can be made within the scope of what is claimed, without departing from the spirit of the invention.

The invention is illustrated in the accompanying drawing, wherein the figure is a cross section of a pneumatic tire showing the present improvements incorporated therein.

The drawing illustrates a conventional or ordinary tire casing 1 and the inner tube 2 therein, and in carrying out the invention, an armour or insert is disposed between the casing and tube, being a bag or pocket of horseshoe-shaped cross section or similar section so as to be disposed snugly between the casing and tube. The bag or pocket has an outer wall 3 to snugly fit the inner surface of the casing, and has an inner wall 4 within which the tube 2 is fitted. Said bag or pocket can be constructed of leather, fabric or other suitable pliant or flexible material, preferably of good quality to serve as a protection for the tube. The edges of the walls 3 and 4 are united, as at 5, and the space within the bag is filled with individual relatively-removable resilient members, which, as shown, are hollow rubber balls 6. These balls or members provide resiliency between the tube and casing, and also serve as a protection for the tube to prevent puncturing thereof. Nails, tacks, or other sharp pieces which may penetrate the casing 1 may puncture one or more of these balls 6, but this will not make any appreciable reduction in pressure of the tire, and such filler balls or members will protect the tube from being punctured, under almost all conditions. Furthermore, the bag and its filler will not injure the casing or tube, and although the cross sectional area of the tube when inflated is reduced, the resiliency of the balls or members will give life to the tire.

In order that the balls 6 can be inserted into the bag for stuffing or filling same, and to enable the balls to be removed when desired, the inner wall 4 of the bag has an opening 7 near one of its edges, through which the balls can be passed. Flaps 8 and 9 of suitable pliant material are sewed or otherwise fastened to the wall 4 of the bag, as at 10, and extend inwardly to overlap adjacent to the rim 11 between the opposite edges of the bag and casing 1, to project the tube 2. The flap 8 also closes the opening 7 to prevent the tube from expanding into the bag as might be injurious.

Having thus described the invention, what is claimed as new is:—

1. A tire protector and cushion comprising a bag to fit between the tire casing and inner tube, and a filler of individual relatively-movable hollow resilient members within said bag.

2. A tire protector and cushion comprising a bag of a shape to fit between the tire casing and inner tube, and a filler of individual relatively-movable resilient members in the bag.

3. A tire protector and cushion comprising a bag of horseshoe-shaped cross section to fit between a tire casing and inner tube, and a filler of individual relatively-movable hollow resilient balls in said bag.

4. A tire protector comprising a bag to fit within a tire casing and inner tube, a filler in said bag, and a flap secured to the bag to extend beyond one edge thereof between the edges of the bag, the bag having an opening for the passage of the filler closed by said flap.

5. A tire protector comprising a bag of horseshoe-shaped cross section to fit between a tire casing and inner tube, a filler in said bag, the inner wall of said bag having an opening for the passage of the filler near one edge thereof, and flaps secured to said inner wall to overlap between said edges for protecting the inner tube, said opening being located between one of said edges and the corresponding flap to be closed by such flap.

6. A tire protector and cushion comprising a filler to be disposed between the inner tube and the tread of the casing including individual relatively-movable resilient members.

In testimony whereof I hereunto affix my signature.

EDWARD M. BECKMAN.